United States Patent Office 3,089,882
Patented May 14, 1963

3,089,882
COLOR STABILIZING PROCESS FOR THE MANUFACTURE OF ESTER-TYPE ANIONIC SURFACE ACTIVE AGENTS
Leslie M. Schenck, Mountainside, and John G. Papalos, Westfield, N.J., assignors to General Aniline & Film Corporation, New York, N.Y., a corporation of Delaware
No Drawing. Filed Oct. 19, 1960, Ser. No. 63,468
7 Claims. (Cl. 260—400)

The present invention relates to a color stabilizer system for the preparation of ester-type anionic surface active agents and particularly to a process which stabilizes the color of such surface active agents during their manufacture.

In patent application Serial No. 856,366, filed December 1, 1959, now United States Patent No. 3,004,049, issued October 10, 1961, the entire disclosure of which is incorporated herein by reference thereto, there is described a process for preparing a monocarboxylic acid ester of a 2-hydroxyalkane sulfonic acid which is substantially free of color and colored by-products. The process involved consists of heating at least 1 mole of an acylating agent selected from the group consisting of aliphatic and alicyclic monocarboxylic acids of at least 8 carbon atoms with 1 mole of an isethionate of the formula HO—CHR—CHR—$SO_3M$ wherein R is selected from the group consisting of H and lower alkyl of 1 to 4 carbon atoms, and M is a cation selected from the group consisting of alkali metals and alkaline earth metals, at an acid pH and a temperature of about 140 to 320° C. in the presence of a catalytic amount of a compound selected from the group consisting of hypophosphorous acid and its salts, while removing the water formed during the reaction.

In United States Patent 2,923,724, issued to Robert J. Anderson and Leslie M. Schenck on February 2, 1960, there is also disclosed a process of preparing ester-type anionic surface active agents by the reaction of 1 mole of a 2-hydroxyalkane sulfonic acid with at least 1 mole of a monocarboxylic acid of at least 8 carbon atoms in the presence of a phosphorous-containing compound such as o-phosphoric acid, m-phosphoric acid, hypophosphoric acid and phosphorus acid. Although the process of this patent is highly advantageous in eliminating the problem of removal of excess salt or isethionate and for other various reasons, it is still plagued in commercial operation with the problem of undue color degradation.

Despite the fact that the use of o-phosphoric acid, m-phosphoric acid, hypophosphoric acid and phosphorus acid, including salts of hypophosphorus acid, as catalysts yield as ester-type anionic surface active agent in excellent yield and color, prolonged holding of the reaction mixture at elevated temperatures following completion of the reaction tends to promote color degradation, thereby necessitating speed in discharging and cooling the final reaction product to ambient temperatures. Numerous chemical manufacturing procedures are conducted around the clock in many industries. Such continuous operation requires three-shift workers. Under such circumstances, it is readily appreciated that a manufacturing operation may be started in one shift and completed in the interim or final shift. During the shifting of personnel, it is inevitable that certain of the mechanical and chemical reactions involved be kept in abeyance pending full control by the new operating shift. In such cases, the reaction mixture may be held at elevated temperatures for a period of time much longer than is necessary, and as a consequence, color degradation of the desired product ensues.

The problem of color degradation in the foregoing processes is very serious and requires immediate attention and steps to overcome it. Much to our surprise, we found that the introduction of small amounts of alkali and alkaline earth ions other than sodium but including potassium, lithium, barium, calcium, magnesium, cadmium, cesium, rubidium, beryllium and strontium ions into the reaction mixture of the process of the aforementioned patents prior to or during the condensation reaction color stability of the reaction mass as well as the reaction product is obtained. In fact, color stabilization throughout extended periods of heating of the reaction mixture as well as after the reaction has been completed and the final product is held at the temperature of reaction, nevertheless color stability is obtained. This color stabilization provides in large scale shift operations an adequate period of time during which the final product, i.e., monocarboxylic acid ester of an alkali metal isethionate (completed ester-type anionic surface active agent) can be maintained in storage at elevated temperatures, or in a molten condition while flaking, molding, pelletizing or formulating operations are being carried out to transform the completed reaction mass into a convenient physical form for end use.

It is the principal object of the present invention to provide a process which will give a color stabilizer system for the synthesis of ester-type anionic surface active agents derived from alkali and alkaline earth isethionates and monocarboxylic acids of at least 8 carbon atoms.

Other objects and advantages will appear hereinafter.

In attaining the foregoing objects, we discovered that when small amounts of the foregoing alkali metal, other than sodium, and alkaline earth metal ions are introduced as their halides, nitrates, sulfates, phosphates, carbonates, oxalates, citrates, oxides and the like, prior to or during the condensation reaction, excellent color stability is obtained and that the final product may be maintained in the reaction vessel for periods of time as long as 2 to 3 hours and in storage at elevated temperatures or in molten condition prior to discharging for a period of 3 to 5 hours without undergoing any color degradation whatsoever. The introduction of the foregoing ions in the form of their specified cations may range from 0.01% to 10% based on the weight of the alkali metal or alkaline earth metal isethionate. In other words, this percentage must be present over and above that of the ions present in the reaction mixture and available from the alkali metal and alkaline earth metal isethionates. In the majority of numerous large scale operations, we found that the range which gives repeated best results is within 0.03% to 0.05% by weight of the isethionate salt. Surprisingly and unexpectedly, the addition of sodium ions as the halide, nitrate, sulfate, phosphate, carbonate, oxide and the like is ineffective in our process. In other words the desired effect is not obtained in the presence of added sodium ions.

The practice of our invention is specifically applicable to the processes described in the aforementioned patent application and patent, the disclosures and working examples of which are incorporated by reference thereto as a guide to practice the instant process of color stabilization.

The following examples will further illustrate the nature of our process which, however, is not to be considered as being limited thereto. The parts given are all by weight.

*Example I*

Into a 1-liter electrically heated fusion pot fitted with an efficient agitator, thermometer, dropping funnel, distillation condenser and inlet for inert gas were charged 300 parts of cocoanut oil fatty acid, 0.071 part of barium hydroxide, octahydrate and 8 parts of 50% hypophosphorus acid. The reaction mixture was heated with agitation to 200° C. under a slow stream of nitrogen to assist in the removal of moisture. There was then added over 10 minutes with agitation 103.5 parts of sodium isethionate (0.7 mole M.W. 148). The pH of an aqueous suspension of the reaction mixture was 3.6. The reaction mixture was agitated and maintained at 200° C. for 2 hours. A sample at this point showed that the reaction contained 0.67 mole of the cocoanut fatty acid ester of sodium isethionate. The yield was 229 parts of 100% ester having a molar weight of 342. The analysis employed to determine the activity of the ester was made by the conventional methylene blue method.

A 2.5 aqueous solution of the product gave an A.P.H.A. color 4.

The A.P.H.A. color method which is a standard method is described in Standard Method for the Examination of Water and Sewage, 9th ed., pp. 14–15, Publication Office: American Public Health Association, 1790 Broadway, New York 19, N.Y. (May also be referred to as the Hazen platinum-cobalt color scale as described by the American Public Health Association publication.)

The foregoing reaction mixture was not discharged from the heated pot but was held an additional 6 hours at 200° C. Upon analysis, the mixture contained 0.68 mole of the cocoanut fatty ester of sodium isethionate and, a 2.5% aqueous solution of the product showed an A.P.H.A. color of 5.

*Example II*

As a control, Example I was repeated with the exception that the addition of barium hydroxide was omitted. After 2 hours heating at 200° C., there was again obtained by analysis 0.67 mole of the sodium isethionate ester of cocoanut fatty acid. A 2.5% aqueous solution of this product had an A.P.H.A. color of 4. The reaction mixture was held an additional 6 hours at 200° C. Upon analysis, the mixture still contained 0.67 mole of the desired ester, however, a 2.5% solution of the product now has an A.P.H.A. color of 17.

*Example III*

Example I was again repeated with the exception that the barium hydroxide octahydrate was replaced by 0.042 part of potassium hydroxide. At the end of 2 hours at 200° C., 97.6% of the sodium isethionate charged was converted to the corresponding cocoanut fatty acid ester. The A.P.H.A. color of a 2.5% solution of the product was 3. At the end of an additional 4 hours at 200° C., the conversion by analysis was at 97.6% and the A.P.H.A. color of a 2.5% solution of the product was 5.

*Example IV*

Example I was again repeated with the exception that the barium hydroxide was replaced by 0.078 part of strontium carbonate and the reaction held at 200° C. for 15 hours. The reaction mixture on analysis indicated that 98% of the sodium isethionate charged was converted to the corresponding cocoanut fatty acid and the A.P.H.A. color of a 2.5% aqueous solution was 6.

*Example V*

Into the fusion pot of Example I there was added a mixture consisting of 285 parts of tallow fatty acid (1 mole M.W. 285), 1.6 parts of sodium hypophosphite, 6 parts of 85% phosphoric acid, 0.127 part of lithium sulfate and 97.6 parts of sodium isethionate. The mixture was agitated at 230° C. for 1 hour at 240 mm. pressure to assist in removing the water formed during the condensation reaction. There were obtained by analysis 263 parts of the tallow fatty acid ester of sodium isethionate representing 95% of the theoretical yield. The pH of the reaction mixture was 3.5. Heating of the product was continued at 225–230° C. for an additional 5 hours. There was no loss of yield by analysis and the A.P.H.A. color of a 2.5% aqueous solution was 6.

*Example VI*

Example V was repeated with the exception that 0.127 part of lithium sulfate was eliminated from the reaction charged. At the termination of 6 hours at 225–230° C., the product was obtained in 95.4% yield by analysis. A 2.5 aqueous solution of the product showed an A.P.H.A. color of 23.

*Example VII*

Example V was again repeated with the exception that the lithium sulfate was replaced by 0.15 part of calcium carbonate which were added in four equal portions of the end of 1, 2, 3 and 4 hours, respectively of the condensation reaction period. At the termination of 6 hours at 225–230° C. the reaction mixture by analysis showed 96.1% conversion of the sodium isethionate charged to the tallow fatty acid ester of sodium isethionate. The A.P.H.A. color of a 2.5 aqueous solution of the product was 7.

*Example VIII*

Into the fusion pot of Example I there was added a mixture consisting of 400 parts of decosanoic acid, 8 parts of sodium hypophosphite, 0.088 part of calcium hydroxide containing 8 moles of water per mole of the hydroxide and 138 parts of sodium-2 hydroxypropane-1-sulfonate. The mixture was agitated at 220° C. for 2 hours and a pressure of 240 mm. There was obtained by analysis 393 parts of a product representing 95.5% of the theoretical yield of the decosanoic acid ester of sodium-2-hydroxypropane-1-sulfonate. The product was further heated with agitation at 220–230° C. for an additional 4 hours. The A.P.H.A. color of a 2.5 aqueous solution of a final product was 7.5.

*Example IX*

A mixture consisting of 400 parts of caprylic acid, 8 parts of sodium hypophosphite, 0.14 part of calcium hydroxide containing 8 moles of water and 244 parts of sodium-2-hydroxybutane-1-sulfonate was added to the fusion part of Example I and agitated for 2 hours at 200–210° C. and the water formed removed azeotropically. There was obtained by analysis 407 parts of the ester representing 97% conversion of theory. Agitating and heating the resulting product for an additional 5½ hours at the same temperature showed no change in color.

*Example X*

Into a fusion pot of Example I there was added a mixture consisting of 228 parts of myristic acid and 6 parts of 5% hypophosphorous acid. The mixture was heated to 200° C.; then 95.5 parts (.5 mole) of sodium 2-hydroxypentane-1-sulfonate containing .09 part of calcium hydroxide was added over a period of 20 minutes. The mixture was heated at 210–220° C. for 2 hours. There was obtained by analysis 310 parts of product representing 94.5% of the theoretical yield of myristic acid ester of sodium-2-hydroxypentane-1-sulfonate. The product was heated for 4 additional hours at 220–225° C. The APHA color of 2.5 aqueous solution of the final product was 6.

*Example XI*

A mixture of 336 parts of cocoanut fatty acid containing 11 parts of 50% hypophosphorous acid was charged into a fusion pot of Example I and heated to 200° C. There was added 164 parts (.8 mole) of sodium-2-hydroxyhexane-1-sulfonate containing 0.1 part of potassium sulfate. The mixture was heated with agitation at 210–220° C. for 2 hours. There was obtained by analysis 490 parts of product representing 95.8% of the theoretical yield of cocoanut fatty acid ester of sodium-2-hydroxyhexane-1-sulfonate. The product was further heated at 210–220° C. for additional 4 hours. The APHA color of a 2.5% aqueous solution of the product remained at 7 throughout the heating period.

We claim:
1. In the process of preparing ester-type anionic surface active agents by the condensation reaction of a monocarboxylic acid of from 8 to 22 carbon atoms with a salt selected from the group of alkali metal and alkaline earth metals of a β-alkylisethionate, wherein the alkyl is of 1 to 4 carbon atoms, at a pH of about 2.5 to 3.5 and a temperature of 140 to 320° C. in the presence of a catalytic amount of a compound selected from the group consisting of hypophosphorous acid and its metal, ammonium and amine salts, the improvement of obtaining the said surface active agents substantially color free which comprises introducing at a stage of said reaction consisting of prior to the onset of the said reaction and during the said reaction from 0.01 to 10% of an inorganic compound selected from the group consisting of halides, nitrates, sulfates, phosphates, carbonates, oxalates and citrates of metals selected from the class consisting of potassium lithium, cesium, rubidium, beryllium, barium, calcium, magnesium, cadmium and strontium.

2. The process according to claim 1 wherein the inorganic compound is barium hydroxide.
3. The process according to claim 1 wherein the inorganic compound is potassium hydroxide.
4. The process according to claim 1 wherein the inorganic compound is strontium carbonate.
5. The process according to claim 1 wherein the inorganic compound is lithium sulfate.
6. The process according to claim 1 wherein the inorganic compound is calcium carbonate.
7. The process according to claim 1 wherein the inorganic compound is calcium hydroxide.

References Cited in the file of this patent
UNITED STATES PATENTS

| | | |
|---|---|---|
| 2,635,103 | Molteni et al. | Apr. 14, 1953 |
| 2,898,352 | Schenck | Aug. 4, 1959 |
| 2,923,724 | Anderson et al. | Feb. 2, 1960 |